United States Patent
Zhou et al.

(10) Patent No.: US 8,918,125 B2
(45) Date of Patent: Dec. 23, 2014

(54) METHOD FOR SHORT MESSAGE SIGNALING INTERCOMMUNICATION AND SHORT MESSAGE SERVICE CENTER

(75) Inventors: Yejuan Zhou, Shenzhen (CN); Jian Zhong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 465 days.

(21) Appl. No.: 13/257,957

(22) PCT Filed: Feb. 20, 2010

(86) PCT No.: PCT/CN2010/070696
§ 371 (c)(1),
(2), (4) Date: Feb. 13, 2012

(87) PCT Pub. No.: WO2011/017918
PCT Pub. Date: Feb. 17, 2011

(65) Prior Publication Data
US 2012/0270577 A1    Oct. 25, 2012

(30) Foreign Application Priority Data
Aug. 14, 2009   (CN) .......................... 2009 1 0090912

(51) Int. Cl.
| | |
|---|---|
| H04W 4/00 | (2009.01) |
| H04M 3/42 | (2006.01) |
| H04L 12/58 | (2006.01) |
| H04W 8/28 | (2009.01) |
| H04W 4/14 | (2009.01) |
| H04W 8/18 | (2009.01) |

(52) U.S. Cl.
CPC . *H04W 8/28* (2013.01); *H04W 4/14* (2013.01); *H04W 8/18* (2013.01)
USPC ...................... 455/466; 455/412.1; 455/414.4

(58) Field of Classification Search
CPC ............ H04W 8/28; H04W 8/14; H04W 8/18
USPC ............................. 455/466, 412, 412.1, 414.4
See application file for complete search history.

(56) References Cited

U.S. PATENT DOCUMENTS

| | | |
|---|---|---|
| 6,738,633 B2 | 5/2004 | Kim et al. |
| 2002/0052211 A1 | 5/2002 | Kim et al. |

(Continued)

FOREIGN PATENT DOCUMENTS

| | | |
|---|---|---|
| CN | 1929629 A | 3/2007 |
| CN | 1984366 A | 6/2007 |

(Continued)

OTHER PUBLICATIONS

International Search Report on international application No. PCT/CN2010/070696, mailed on May 27, 2010.

(Continued)

*Primary Examiner* — Opiribo Georgewill
(74) *Attorney, Agent, or Firm* — Oppedahl Patent Law Firm LLC

(57) ABSTRACT

The present disclosure discloses a method for short message signaling intercommunication and a short message service center (SMSC), relating to the field of mobile number portability (MNP) service in mobile communications technology, and applying to solve the problem in the prior art that the process of the short message signaling intercommunication cannot be applied to the MNP service. The method includes: step 1, the SMSC of a sending network receives a mobile original (MO) message from a mobile switching center (MSC) of the sending network, wherein the MO message includes the mobile directory number (MDN) of a receiving terminal (21); step 2, according to the MDN of the receiving terminal, the SMSC of the sending network inquires of the number portability data base (NPDB) about the current home network of the receiving terminal, and acquires the information of the current home network of the receiving terminal (22); and step 3, according to the information of the current home network of the receiving terminal, the SMSC of the sending network transmits the mobile terminal (MT) message (23) generated according to the MO message to the MSC of the current home network of the receiving terminal. The present disclosure is applied to the short message signaling intercommunication in the mobile number portability service.

11 Claims, 6 Drawing Sheets

(56) References Cited

U.S. PATENT DOCUMENTS

| | | | |
|---|---|---|---|
| 2002/0112014 A1* | 8/2002 | Bennett et al. | 709/206 |
| 2003/0003930 A1* | 1/2003 | Allison et al. | 455/466 |
| 2010/0009701 A1* | 1/2010 | Cai et al. | 455/466 |
| 2010/0111273 A1* | 5/2010 | Strommer | 379/114.05 |
| 2014/0171019 A1* | 6/2014 | Chen et al. | 455/406 |

FOREIGN PATENT DOCUMENTS

| | | |
|---|---|---|
| CN | 101282503 A | 10/2008 |
| CN | 101621769 A | 1/2010 |

OTHER PUBLICATIONS

English Translation of the Written Opinion of the International Search Authority in international application No. PCT/CN2010/070696, mailed on May 27, 2010.

* cited by examiner

METHOD FOR SHORT MESSAGE SIGNALING INTERCOMMUNICATION AND SHORT MESSAGE SERVICE CENTER

TECHNICAL FIELD

The present disclosure relates to Mobile Number Portability service in mobile communications technology, particular to a method for short message signaling intercommunication and a short message service center.

BACKGROUND

Mobile Number Portability (MNP) service means that a mobile subscriber does not change the original number of its mobile station in Integrated Services Digital Network (ISDN) when a subscribed network is changed. Based on the MNP service, a new subscribed network allocates a new International Mobile Subscriber Identification (IMSI) number to the Ported-in mobile subscriber, and the ported-in mobile subscriber enjoys all the services of the new subscribed network.

At present, typical signaling intercommunication is message intercommunication between a Code Division Multiple Access (CDMA) mobile communication network and a Global System for Mobile Communication (GSM) network. Taking that GSM transmits a message to CDMA and signaling intercommunication is performed at the CDMA network side as an example, the message procedure includes:

step 11, a GSM Mobile Switching Center (MSC) sends a Mobile Original (MO) message to a GSM Short Message Service Center (SMSC); and a target subscriber is a CDMA subscriber;

step 12, the GSM SMSC returns a response to the GSM MSC;

step 13, the GSM SMSC sends a route request to a CDMA SMSC;

step 14, the CDMA SMSC simulates a Home Location Register (HLR) to return a response to the GSM SMSC, wherein MSC address is the address of the CDMA SMSC in the GSM network;

step 15, the GSM SMSC initiates a Mobile Terminal (MT) delivery operation to the CDMA SMSC;

step 16, the CDMA SMSC simulates the MSC to receive the MT message and transmits a response to the GSM SMSC; or the CDMA SMSC returns a response to the GSM SMSC after the CDMA SMSC sends a message to the CDMA HLR;

step 17, the CDMA SMSC sends a route request to the CDMA HLR;

step 18, the CDMA HLR returns a response to the CDMA SMSC;

step 19, the CDMA SMSC sends the MT message to the CDMA MSC; and step 110, the CDMA MSC returns a response.

During the signaling intercommunication based on the Mobile Number Portability service, a called terminal to which a message is delivered from a sending may be a third-party network subscriber, and the procedure above does not consider the short message intercommunication in the Mobile Number Portability service, so it cannot be applied to the Mobile Number Portability service.

SUMMARY

The technical problem to be solved by the present disclosure is to provide a method for short message signaling intercommunication and a short message service center, which can be applied to the Mobile Number Portability service.

To solve the technical problem above, the embodiments of the present disclosure provide technical solutions as follows.

In one aspect, a method for short message signaling intercommunication is provided, including:

step 11, a short message service center (SMSC) of a sending network receives an MO message from a mobile switching center (MSC) of the sending network, wherein the MO message includes a mobile directory number of a receiving terminal;

step 12, according to the mobile directory number of the receiving terminal, the SMSC of the sending network inquires of a number portability data base (NPDB) about a current home network of the receiving terminal; and step 13, the SMSC of the sending network transmits an MT message to an MSC of the current home network.

Wherein, if the protocol type of the current home network is different from that of the sending network, the MT message is a message constructed according to the protocol type of the current home network.

Wherein, before the step 13, the method may further include:

the SMSC of the sending network transmits a route request message to a home location register (HLR) of the current home network, wherein the route request message includes the mobile directory number of the receiving terminal; and the SMSC of the sending network receives a route response message from the HLR, wherein the route response message includes an MSC address of the current home network corresponding to the receiving terminal; and the step 13 specifically is:

the SMSC transmits the MT message to an MSC of the current home network according to the MSC address of the current home network.

Wherein, the route response message further includes International Mobile Subscriber Identity (IMSI) information of the receiving terminal in the current home network.

In another aspect, a method for short message signaling intercommunication is provided, including:

step 21, an SMSC of a receiving network receives a first route request message from an SMSC of a sending network, wherein the first route request message includes a mobile directory number of a receiving terminal;

step 22, the SMSC of the receiving network inquires of an NPDB about a current home network of the receiving terminal, according to the mobile directory number of the receiving terminal; and step 23, the SMSC of the receiving network transmits a second route request message to the HLR of the current home network of the receiving terminal, so as to make the SMSC of the sending network transmit an MT message to an MSC of the current home network.

if the protocol type of the receiving network is different from that of the sending network, after the step 21, the method may further include: the SMSC of the receiving network performs a signaling conversion on the received first route request message, according to the protocol type of the receiving network; and if the protocol type of the receiving network is different from that of the current home network of the receiving terminal, the second route request message is the one constructed according to the protocol of the current home network of the receiving terminal.

if the current home network of the receiving terminal is the receiving network, the step 23 specifically is:

the SMSC of the receiving network transmits a second route request message to an HLR of the receiving network, wherein the second route request message includes the mobile directory number of the receiving terminal;

the SMSC of the receiving network receives a first route response message from the HLR of the receiving network, wherein the first route response message includes an MSC address of the current home network corresponding to the receiving terminal;

the SMSC of the receiving network transmits a second route response message to the SMSC of the sending network, wherein the second route response message includes an address of the SMSC of the receiving network in the sending network, so that the SMSC of the sending network transmits the MT message to the SMSC of the receiving network according to the address;

the SMSC of the receiving network receives the MT message from the SMSC of the sending network; and the SMSC of the receiving network sends the MT message to the MSC of the receiving network.

The first route response message may further include IMSI information of the receiving terminal in the current home network;

the second route response message may further include IMSI information of the receiving terminal in the current home network; and the MT message may include IMSI information of the receiving terminal in the current home network; wherein, after the SMSC of the receiving network receives the first route response message from the HLR of the receiving network, the method may further include:

the SMSC of the receiving network stores corresponding relationships among the mobile directory number of the receiving terminal, the MSC address of the receiving network corresponding to the receiving terminal and the IMSI information of the receiving terminal in the current home network; and before the step that the SMSC of the receiving network sends the MT message to the MSC of the receiving network, the method may further include:

the SMSC of the receiving network acquires IMSI information of the receiving terminal in the current home network from the MT message; and the SMSC of the receiving network acquires an MSC address of the receiving network corresponding to the IMSI information of the receiving terminal in the current home network, according to the corresponding relationships; and the SMSC of the receiving network transmitting the MT message to the MSC of the receiving network, specifically is:

the SMSC of the receiving network transmits the MT message to the MSC of the receiving network, according to the MSC address of the receiving network.

The first route response message may further include the IMSI information of the receiving terminal in the current home network;

the second route response message may further include the IMSI information of the receiving terminal in the current home network; and the MT message may include the mobile directory number of the receiving terminal;

after the step that the SMSC of the receiving network receives the first route response message from the HLR of the receiving network, the method may further include:

the SMSC of the receiving network stores corresponding relationships among the mobile directory number of the receiving terminal, the MSC address of the receiving network corresponding to the receiving terminal and the IMSI information of the receiving terminal in the current home network; and before the step that the SMSC of the receiving network transmits the MT message to the MSC of the receiving network, the method may further include:

the SMSC of the receiving network acquires the mobile directory number of the receiving terminal from the MT message; and the SMSC of the receiving network acquires the MSC address of the receiving network corresponding to the receiving terminal according to the corresponding relationships;

the SMSC of the receiving network transmitting the MT message to the MSC of the receiving network, specifically is:

the SMSC of the receiving network transmits the MT message to the MSC of the receiving network according to the MSC address of the receiving network.

When the current home network of the receiving terminal is a third-party network, the step 23 specifically is:

the SMSC of the receiving network forwards the second route request message to the HLR of the third-party network, wherein the second route request message includes the mobile directory number of the receiving terminal;

the SMSC of the receiving network receives a third route response message from the HLR of the third-party network, wherein the third route response message includes the MSC address of the third-party network corresponding to the receiving terminal; and the SMSC of the receiving network transmits a fourth route response message to the SMSC of the sending network, wherein the fourth route response message includes the MSC address of the third-party network, so that the SMSC of the sending network transmits the MT message to the MSC of the third-party according to the address.

The third route response message may further include the IMSI information of the receiving terminal in the current home network; and the fourth route response message may further include the IMSI information of the receiving terminal in the current home network.

When the current home network of the receiving terminal is a third-party network, the step 23 specifically is:

the SMSC of the receiving network forwards the second route request message to the HLR of the third-party network, wherein the second route request message includes the mobile directory number of the receiving terminal, so that the HLR of the third-party network transmits a fifth route response message to the SMSC of the sending network according to the address, wherein the fifth route response message includes the MSC address of the third-party network corresponding to the receiving terminal, thereby the SMSC of the sending network transmits the MT message to the MSC of the third-party network according to the address.

The fifth route response message may further include the IMSI information of the receiving terminal in the current home network.

In another aspect, a short message service center (SMSC) is provided, if the SMSC is located in a sending network, the SMSC includes:

a receiving unit, configured for receiving an MO message from an MSC of the sending network, wherein the MO message includes a mobile directory number of a receiving terminal;

a query unit, configured for inquiring of an NPDB about a current home network of the receiving terminal, according to the mobile directory number of the receiving terminal; and a transmitting unit, configured for transmitting an MT message to an MSC of the current home network.

In another aspect, a short message service center (SMSC) is provided, if the SMSC is located in a receiving network, the SMSC includes:

a receiving unit, configured for receiving a first route request message from an SMSC of a sending network, wherein the first route request message includes a mobile directory number of a receiving terminal;

a query unit, configured for inquiring of an NPDB about a current home network of the receiving terminal, according to the mobile directory number of the receiving terminal; and a transmitting unit, configured for transmitting a second route request message to an HLR of the current home network of the receiving terminal, so that the SMSC of the sending network transmits an MT message to an MSC of the current home network.

The embodiments of the present disclosure have the following advantaged effects:

in the technical solutions above, the SMSC of the sending network transmits the MT message generated according to the MO message to the MSC of the current home network of the receiving terminal, according to the information of the current home network of the receiving terminal; or, the SMSC of the receiving network transmits the second route request message to the HLR of the current home network of the receiving terminal according to the current home network of the receiving terminal, so that the SMSC of the sending network transmits the MT message generated according to the MO message to the MSC of the current home network of the receiving terminal, in this way, the technical solutions can be applied to the intercommunication of short message signaling based on the mobile number portability service.

DETAILED DESCRIPTION

To make the technical problem to be solved by the embodiments of the present disclosure, the technical solution and the advantages more clear, the present disclosure is described below with reference to the accompanying drawings and embodiments in detail.

The embodiments of the present disclosure provide a method for short message signaling intercommunication and a short message service center to solve the problem in the prior art that the procedure of short message signaling intercommunication cannot be applied to the Mobile Number Portability service.

Figure 1:
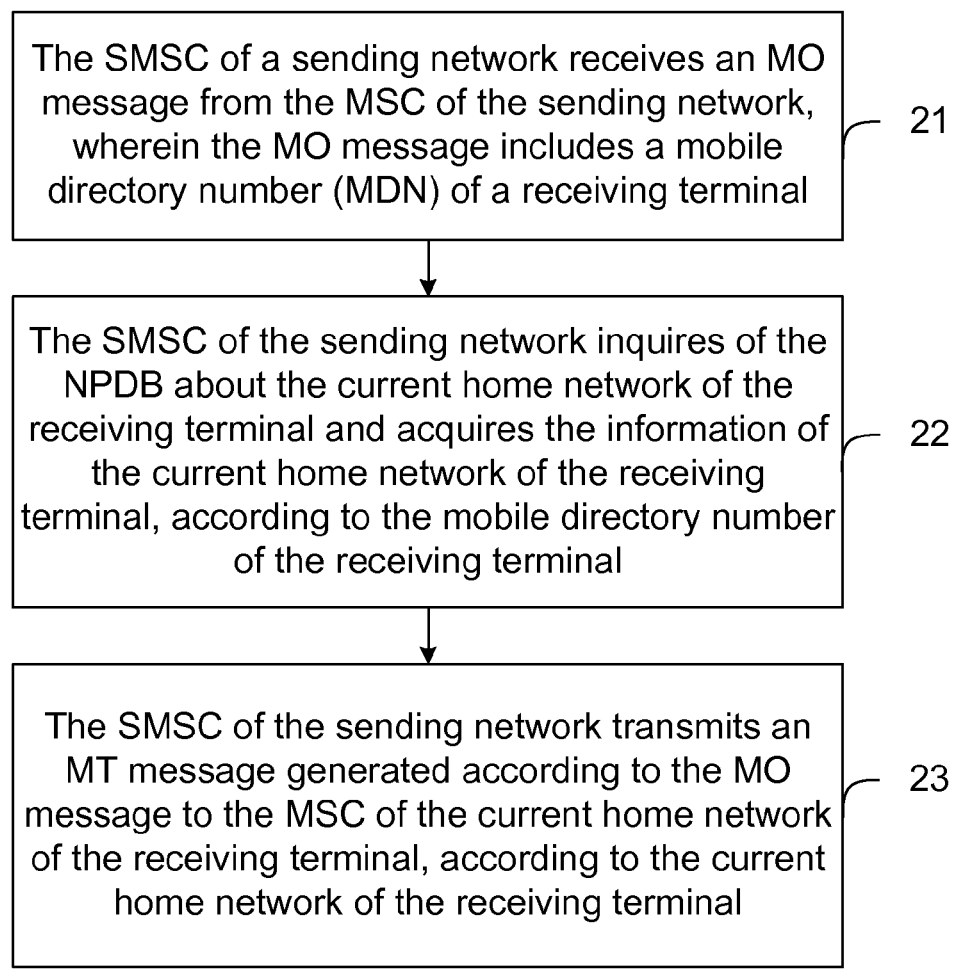
FIG. 1 shows a flowchart of an embodiment of a method for short message signaling intercommunication at a sending side in the present disclosure.

As shown in FIG. 1, it is an embodiment of the method for short message signaling intercommunication in the present disclosure, which is described from the aspect of an SMSC side of a sending network, including:

step 21, an SMSC of the sending network receives an MO message from an MSC of the sending network, wherein the MO message includes a mobile directory number (MDN) of a receiving terminal;

step 22, according to the mobile directory number of the receiving terminal, the SMSC of the sending network inquires of an NPDB about the current home network of the receiving terminal, and acquires information of the current home network of the receiving terminal; and step 23, the SMSC of the sending network transmits an MT message generated based on the MO message to an MSC of the current home network of the receiving terminal, according to the information of the current home network of the receiving terminal.

In the technical solution above, the step that the SMSC of the sending network transmits an MT message generated based on the MO message to an MSC of the current home network of the receiving terminal according to the information of the current home network of the receiving terminal can be applied to the short message signaling intercommunication based on the MNP service.

Another embodiment of the method for short message signaling intercommunication in the present disclosure is described from the aspect of an SMSC side of a sending network, including:

step 31, an SMSC of the sending network receives an MO message from an MSC of the sending network, wherein the MO message includes a mobile directory number of a receiving terminal;

step 32, the SMSC of the sending network inquires of an NPDB about the current home network of the receiving terminal according to the mobile directory number of the receiving terminal, and acquires information of the current home network of the receiving terminal;

step 33, the SMSC of the sending network transmits a route request message to an HLR of the current home network of the receiving terminal, wherein the route request message includes the mobile directory number of the receiving terminal;

step 34, the SMSC of the sending network receives a route response message from the HLR of the current home network of the receiving terminal, wherein the route response message includes an MSC address of the current home network corresponding to the receiving terminal, and optionally further includes IMSI information of the receiving terminal in the current home network; and step 35, the SMSC of the sending network transmits an MT message generated based on the MO message to an MSC of the current home network corresponding to the receiving terminal, according to the MSC address of the current home network.

Figure 2:
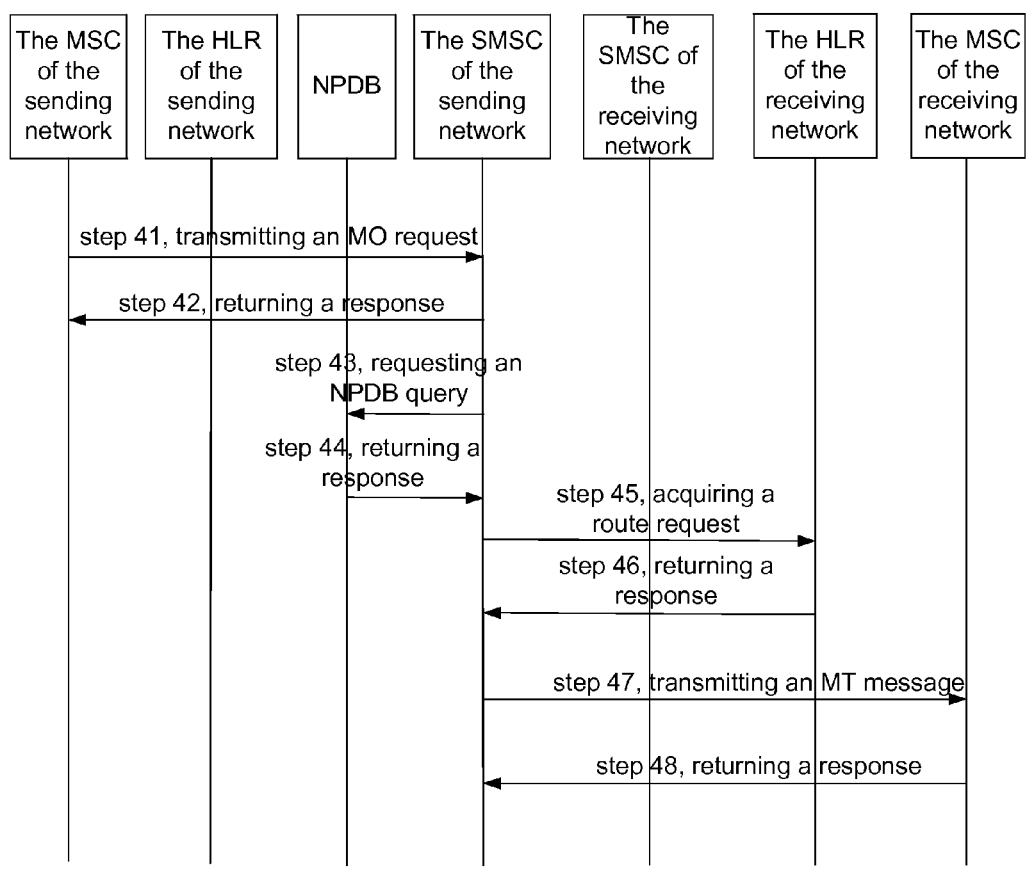
FIG. 2 shows a message flowchart of an application scene of the method for short message signaling intercommunication shown in FIG. 1.

FIG. 2 shows a message flowchart of an application scene of the method for short message signaling intercommunication in the present disclosure, including:

step 41, a sending network sends an MO message; and an MSC of the message sending network submits the received MO message to an SMSC of the message sending network;

step 42, the SMSC of the message sending network returns a response;

step 43, the SMSC of the message sending network inquires of an NPDB about the current home network of a receiving network;

step 44, the SMSC of the message sending network receives a response returned by the NPDB;

step 45, the MSC of the message sending network determines the current home network of the receiving terminal according to the home network determined by the returned result and a segment number to which the mobile directory number of the receiving terminal belongs, and inquires an HLR of the current home network of the receiving terminal about a route request; this step specifically comprises: if the current home network to which the mobile directory number of the receiving terminal belongs is found in the NPDB, then it indicates that the receiving terminal has a Mobile Number Portability service, and the current home network of the receiving terminal is the one found in the NPDB; and if the current home network to which the mobile directory number of the receiving terminal belongs is not found in the NPDB, then the current home network of the receiving terminal is the one determined according to the segment number to which the mobile directory number belongs;

step 46, the SMSC of the message sending network receives a response returned by the HLR;

step 47, the SMSC of the message sending network sends an MT message to the receiving network; and step 48, the SMSC of the message sending network receives a response.

In the technical solution above, if the receiving terminal is not a third-party network subscriber, then a message is sent directly according to the procedure in the prior art; if the receiving terminal is a third-party network subscriber, then the message is converted and constructed according to a network protocol of the third-party network and delivered to the third-party network. The delivery herein comprises the forwarding of an MO message or direct delivering of an MT message to the third-party network. The forwarding of an MO message is that the SMSC of the message sending network directly forwards an MO message to an SMSC of a receiving network, and the subsequent procedure of sending a short message is completed by the SMSC of the receiving network.

In addition, when the SMSC of the message sending network sends an request to an HLR of the message receiving network and sends an MT message to an MSC of the receiving network, if the protocol types of the receiving network and the sending network are the same, then the SMSC of the message sending network does not need to perform a signaling conversion but directly constructs a message to send; if the protocol types of the receiving network and the sending network are different, then the SMSC of the message sending network needs to perform a signaling conversion, and constructs a message according to the protocol type of the receiving network to send, that is, if the protocol type of the receiving network is different from that of the sending network, a signaling conversion is needed to be performed in the step 45, the step 46, the step 47 and the step 48 in the technical solution above.

Figure 3:
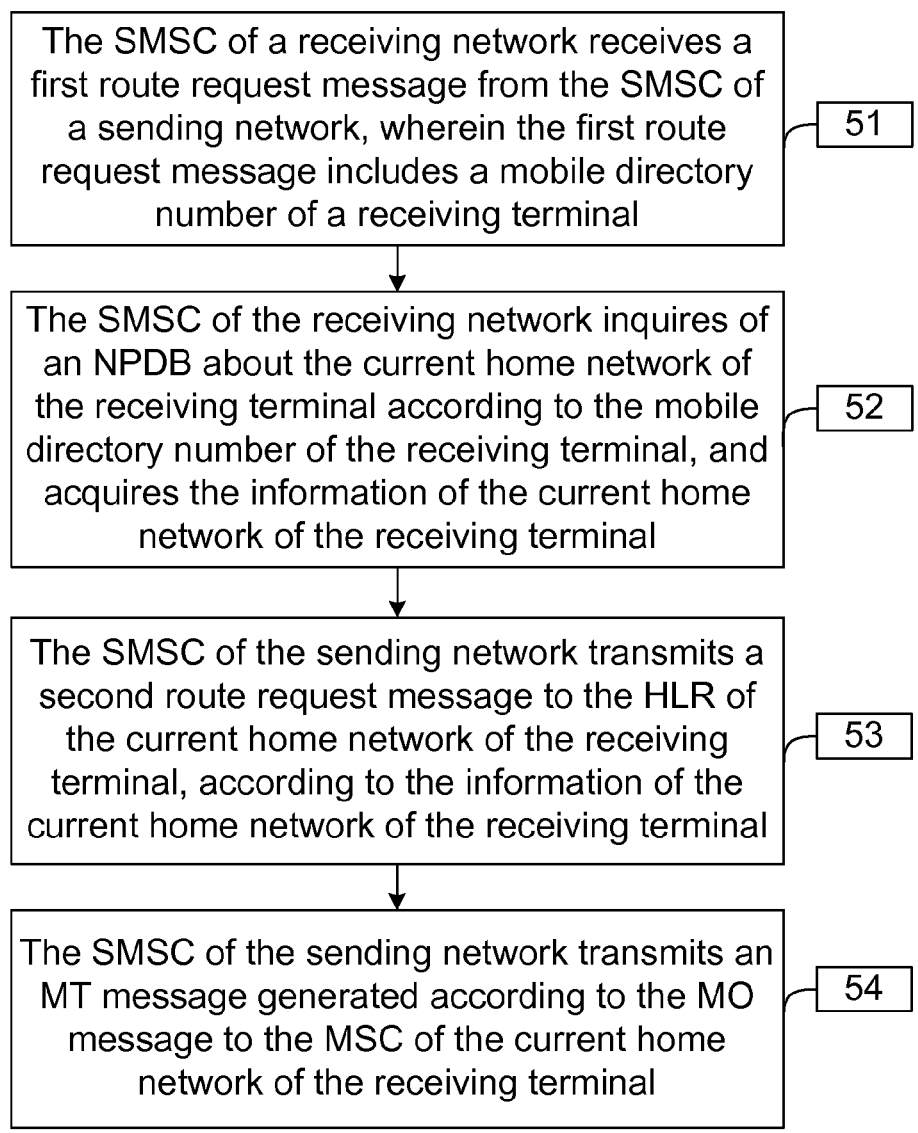
FIG. 3 shows a flowchart of an embodiment of a method for short message signaling intercommunication at a receiving side in the present disclosure.

FIG. 3 shows an embodiment of the method for short message signaling intercommunication in the present disclosure; and the embodiment is described from the aspect of an SMSC side of a receiving network, including:

step 51, the SMSC of the receiving network receives a first route request message from an SMSC of a sending network, wherein the first route request message includes a mobile directory number of a receiving terminal;

step 52, the SMSC of the receiving network inquires of an NPDB about the current home network of the receiving terminal according to the mobile directory number of the receiving terminal, and acquires information of the current home network of the receiving terminal;

step 53, the SMSC of the receiving network transmits a second route request message to an HLR of the current home network of the receiving terminal, according to information of the current home network of the receiving terminal;

step 54, the SMSC of the sending network transmits an MT message generated according to an MO message to an MSC of the current home network of the receiving terminal;

wherein, the receiving network is a home network determined according to a segment number to which the mobile directory number of the receiving terminal belongs.

In the technical solution above, the SMSC of the receiving network transmits the second route request message to the HLR of the current home network of the receiving terminal, according to the information of the current home network of the receiving terminal, so that the SMSC of the sending network transmits the MT message generated according to the MO message to the MSC of the current home network of the receiving terminal, therefore such technical solution can be applied to the short message signaling intercommunication based on the Mobile Number Portability service.

The following description is another embodiment of the method for short message signaling intercommunication in the present disclosure; the embodiment is described from the aspect of an SMSC side of a receiving network, and when the current home network of a receiving terminal is the receiving network, the method comprises:

step 61, the SMSC of the receiving network receives a first route request message from an SMSC of a sending network, wherein the first route request message includes a mobile directory number of a receiving terminal;

step 62, the SMSC of the receiving network inquires of an NPDB about the current home network of the receiving terminal according to the mobile directory number of the receiving terminal, and acquires information of the current home network of the receiving terminal;

step 63, the SMSC of the receiving network transmits a second route request message to an HLR of the receiving network, wherein the second route request message includes the mobile directory number of the receiving terminal;

step 64, the SMSC of the receiving network receives a first route response message from the HLR of the receiving network, wherein the first route response message includes an MSC address of the receiving network corresponding to the receiving terminal;

step 65, the SMSC of the receiving network transmits a second route response message to the SMSC of the sending network, wherein the second route response message includes an address of the SMSC of the receiving network in the sending network, so that the SMSC of the sending network transmits an MT message to the SMSC of the receiving network according to the address;

step 66, the SMSC of the receiving network receives the MT message from the SMSC of the sending network; and step 67, the SMSC of the receiving network sends the MT message to an MSC of the receiving network.

The following description is another embodiment of the method for short message signaling intercommunication in the present disclosure; the embodiment is described from the aspect of an SMSC side of a receiving network, and when the current home network of a receiving terminal is the receiving network, the method comprises:

step 71, the SMSC of the receiving network receives a first route request message from an SMSC of a sending network, wherein the first route request message includes a mobile directory number of a receiving terminal;

step 72, the SMSC of the receiving network inquires of an NPDB about the current home network of the receiving terminal according to the mobile directory number of the receiving terminal, and acquires information of the current home network of the receiving terminal;

step 73, the SMSC of the receiving network transmits a second route request message to an HLR of the receiving network, wherein the second route request message includes the mobile directory number of the receiving terminal;

step 74, the SMSC of the receiving network receives a first route response message from the HLR of the receiving network, wherein the first route response message includes an MSC address of the receiving network corresponding to the receiving terminal; and the first route response message further includes IMSI information of the receiving terminal in the current home network;

step 75, the SMSC of the receiving network stores corresponding relationships among the mobile directory number of the receiving terminal, the MSC address of the receiving network corresponding to the receiving terminal and the IMSI information of the receiving terminal in the current home network, which are used for subsequent delivery of an MT message;

step 76, the SMSC of the receiving network transmits a second route response message to the SMSC of the sending network, wherein the second route response message includes an address of the SMSC of the receiving network in the sending network, so that the SMSC of the sending network transmits the MT message to the SMSC of the receiving network according to the address; and the second route response message further includes the IMSI information of the receiving terminal in the current home network;

step 77, the SMSC of the receiving network receives the MT message from the SMSC of the sending network, wherein the MT message includes the IMSI information of the receiving terminal in the current home network;

step 78, the SMSC of the receiving network acquires the IMSI information of the receiving terminal in the current home network from the MT message;

step 79, the SMSC of the receiving network acquires an MSC address of the receiving network to which the IMSI information of the receiving terminal in the current home network corresponds, according to the corresponding relationships; and step 710, the SMSC of the receiving network forwards the MT message to an MSC of the receiving network according to the MSC address of the receiving network.

The following description is another embodiment of the method for short message signaling intercommunication in the present disclosure; the embodiment is described from the aspect of an SMSC side of a receiving network, and when the current home network of a receiving terminal is the receiving network, the method comprises:

step 81, the SMSC of the receiving network receives a first route request message from an SMSC of a sending network, wherein the first route request message includes a mobile directory number of a receiving terminal;

step 82, the SMSC of the receiving network inquires of an NPDB about the current home network of the receiving terminal according to the mobile directory number of the receiving terminal, and acquires information of the current home network of the receiving terminal;

step 83, the SMSC of the receiving network transmits a second route request message to an HLR of the receiving network, wherein the second route request message includes the mobile directory number of the receiving terminal;

step 84, the SMSC of the receiving network receives a first route response message from the HLR of the receiving network, wherein the first route response message includes an MSC address of the receiving network corresponding to the receiving terminal; and the first route response message further includes IMSI information of the receiving terminal in the current home network;

step 85, the SMSC of the receiving network stores corresponding relationships among the mobile directory number of the receiving terminal, the MSC address of the receiving network corresponding to the receiving terminal and the IMSI information of the receiving terminal in the current home network;

step 86, the SMSC of the receiving network transmits a second route response message to the SMSC of the sending network, wherein the second route response message includes an address of the SMSC of the receiving network in the sending network, so that the SMSC of the sending network transmits an MT message to the SMSC of the receiving network according to the address; and the second route response message further includes the IMSI information of the receiving terminal in the current home network;

step 87, the SMSC of the receiving network receives the MT message from the SMSC of the sending network, wherein the MT message includes the mobile directory number of the receiving terminal;

step 88, the SMSC of the receiving network acquires the mobile directory number of the receiving terminal from the MT message;

step 89, the SMSC of the receiving network acquires an MSC address of the receiving network corresponding to the receiving terminal, according to the corresponding relationships; and step 810, the SMSC of the receiving network forwards the MT message to the MSC of the receiving network according to the MSC address of the receiving network.

The following description is another embodiment of the method for short message signaling intercommunication in the present disclosure; and the embodiment is described from the aspect of an SMSC side of a receiving network, the receiving network is a home network determined according to a segment number to which a mobile directory number of a receiving terminal belongs, and the current home network of the receiving terminal is a third-party network; the method comprises:

step 91, the SMSC of the receiving network receives a first route request message from an SMSC of a sending network, wherein the first route request message includes a mobile directory number of a receiving terminal;

step 92, the SMSC of the receiving network inquires of an NPDB about the current home network of the receiving terminal according to the mobile directory number of the receiving terminal, and acquires information of the current home network of the receiving terminal;

step 93, the SMSC of the receiving network forwards a second route request message to an HLR of a third-party network, wherein the second route request message includes the mobile directory number of the receiving terminal;

step 94, the SMSC of the receiving network receives a third route response message from the HLR of the third-party network, wherein the third route response message includes an MSC address of the third-party network corresponding to the receiving terminal; and optionally, the third route response message further includes IMSI information of the receiving terminal in the current home network; and step 95, the SMSC of the receiving network transmits a fourth route response message to the SMSC of the sending network, wherein the fourth route response message includes an MSC address of the third-party network, so that the SMSC of the sending network transmits an MT message generated based on an MO message to an MSC of the third-party network according to the MSC address of the third-party network; and optionally, the fourth route response message further includes IMSI information of the receiving terminal in the current home network.

The following description is another embodiment of the method for short message signaling intercommunication in the present disclosure; the embodiment is described from the aspect of an SMSC side of a receiving network; and the receiving network is a home network determined according to a segment number to which a mobile directory number of a receiving terminal belongs, and the current home network of the receiving terminal is a third-party network; the method comprises:

step 101, the SMSC of the receiving network receives a first route request message from an SMSC of a sending network, wherein the first route request message includes a mobile directory number of a receiving terminal;

step 102, the SMSC of the receiving network inquires of an NP DB about the current home network of the receiving terminal according to the mobile directory number of the receiving terminal, and acquires information of the current home network of the receiving terminal;

step 103, when the current home network of the receiving terminal is a third-party network, the SMSC of the receiving network forwards a second route request message to an HLR of the third-party network, wherein the second route request message includes the mobile directory number of the receiving terminal;

step 104, the HLR of the third-party network transmits a fifth route response message to the SMSC of the sending network, wherein the fifth route response message includes an MSC address of the third-party network corresponding to the receiving terminal; and step 105, the SMSC of the sending network transmits an MT message generated based on an MO message to an MSC of the third-party network according to the MSC address of the third-party network; and optionally, the fifth route response message further includes IMSI information of the receiving terminal in the current home network.

Figure 4:
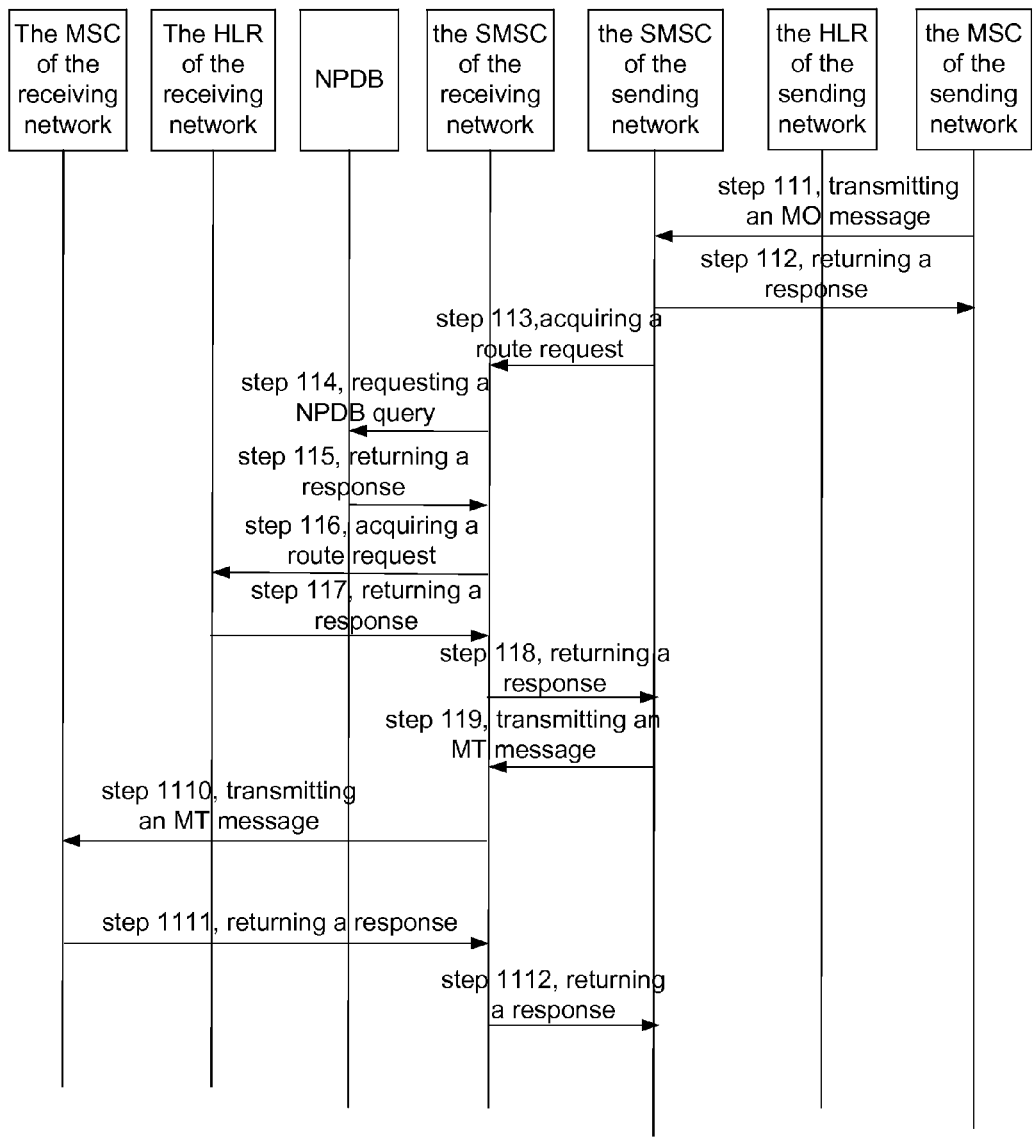
FIG. 4 shows a message flowchart of an application scene of the method for short message signaling intercommunication shown in FIG. 3.

FIG. 4 shows a message flowchart of an application scene of the method for short message signaling intercommunication in the present disclosure; the receiving network is a home network determined according to a segment number to which a mobile directory number of a receiving terminal belongs, and the current home network of the receiving terminal is the receiving network; and the flow comprises:

step 111, an MSC of a message sending network submits an MO message to an SMSC of the message sending network;

step 112, the SMSC of the message sending network returns a response to the MSC of the message sending network;

step 113, the SMSC of the message sending network sends a route request to an SMSC of a message receiving network;

step 114, the SMSC of the message receiving network inquires of an NPDB about the current home network of a receiving terminal;

step 115, the SMSC of the message receiving network receives a response returned by the NPDB;

step 116, the SMSC of the message receiving network determines the current home network of the receiving terminal synthetically according to the returned result and a home network of a segment number to which the mobile directory number of the receiving terminal belongs, and transmits a route request to an HLR of the receiving network after determining that the current home network of the receiving terminal is the receiving network;

step 117, the SMSC of the message receiving network receives a response returned by the HLR of the message receiving network;

step 118, after receiving the real route response from the HLR, the SMSC of the message receiving network stores related information of the route response, and returns a real route request response message to the original sending network; wherein, the stored related information of the route response includes corresponding relationships among the real IMSI, the MSC address and the mobile directory number (MDN); and the real route information returned to the sending network includes the IMSI information of the receiving terminal in the current home network and the MSC address of the SMSC of the message receiving network in the sending network;

step 119, the SMSC of the message receiving network receives an MT message which is sent by the SMSC of the message sending network;

step 1110, the SMSC of the message receiving network performs a protocol transmitting-receiving conversion, and sends the MT message to the MSC of the receiving network;

step 1111, the SMSC of the message receiving network receives a delivery response from the MSC; and step 1112, the SMSC of the message receiving network returns a response to the SMSC of the sending network.

In the technical solution above, the sending network initiates a route request message; the receiving network receives the route request message from the sending network; the receiving network inquires of the NPDB and determines the current home network of the receiving terminal synthetically according to the response result and the home network of the segment number to which the mobile directory number of the receiving terminal belongs; the receiving network transmits a route request message corresponding to signaling of the receiving network to the HLR of the current home network of the receiving terminal according to the signaling; after receiving a real route request from the HLR, the receiving network stores related information of the route response, returns a real route request response message to the sending network; the receiving network receives an MT message which is sent by the message sending network, acquires information stored by system, performs a protocol transmitting-receiving conversion and sends a delivery message; and after receiving the sent delivery response, the receiving network returns a response message to the sending network.

In the technical solution above, if the protocol type of the receiving network is different from that of the sending network, a signaling conversion is needed in the step 113, the step 118, the step 119 and the step 1112.

Figure 5:
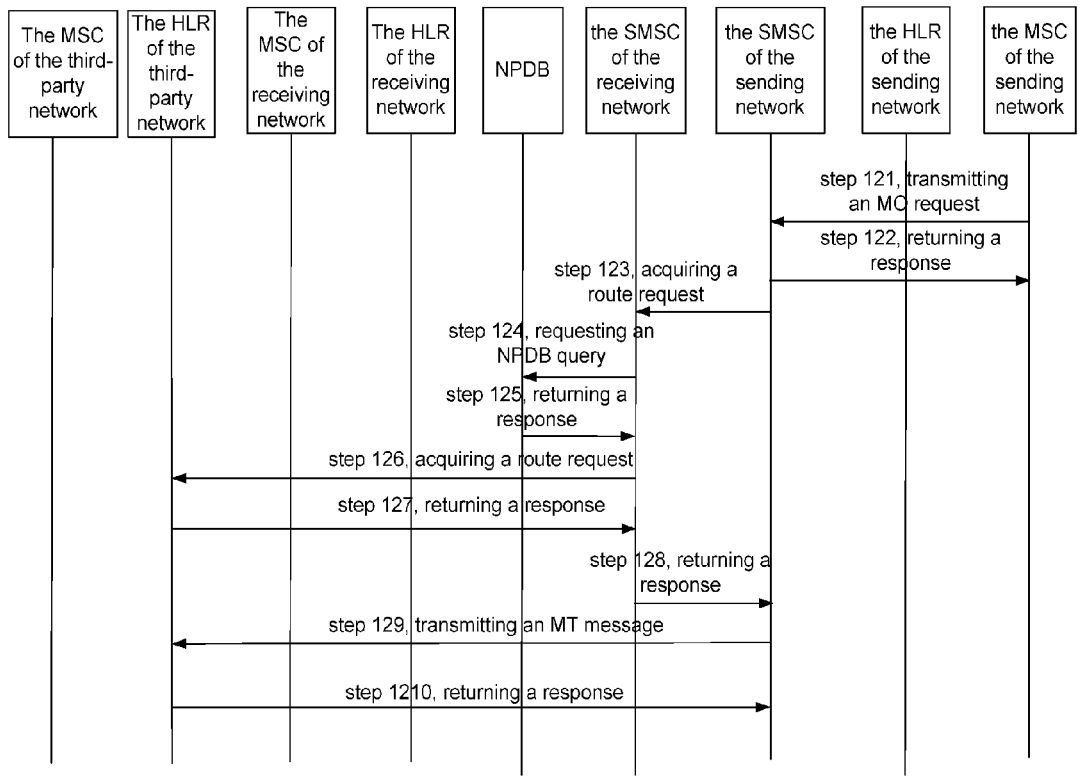
FIG. 5 shows a message flowchart of another application scene of the method for short message signaling intercommunication shown in FIG. 3.

FIG. 5 shows a message flowchart of another application scene of the method for short message signaling intercommunication in the present disclosure; the receiving network is a home network determined according to a segment number to which a mobile directory number of a receiving terminal belongs, and the receiving terminal is a third-party network subscriber; and the method comprises:

step 121, an MSC of a message sending network submits an MO message to an SMSC of the message sending network;

step 122, the SMSC of the message sending network returns a response to an MSC of the message sending network;

step 123, the SMSC of the message sending network sends a route request to an SMSC of a message receiving network;

step 124, the SMSC of the message receiving network inquires of an NPDB about the current home network of a receiving terminal;

step 125, the SMSC of the message receiving network receives a response returned by the NPDB;

step 126, the SMSC of the message receiving network determines the current home network of the receiving terminal synthetically according to the returned result and a home network of a segment number to which the mobile directory number of the receiving terminal belongs, and inquires of an HLR of a third-party network about the route request after determining that the current home network of the receiving terminal is a third-party network;

step 127, the SMSC of the message receiving network receives a response returned by the HLR of the third-party network;

step 128, after receiving a real route request from the HLR of the third-party network, the SMSC of the message receiving network returns a real response message of the route request to the sending network, wherein the response message of the route request includes real IMSI information of the receiving terminal in the current home network and real MSC address of the third-party network;

step 129, the SMSC of the sending network sends an MT message to an MSC of the third-party network; and step 1210, the MSC of the third-party network returns a response message to the SMSC of the sending network.

In the technical solution above, the receiving terminal is a third-party network subscriber and is processed according to a procedure of this network, but a response message transmitted from the SMSC of the message receiving network to the SMSC of the message sending network includes the real MSC address of the third-party network which is used for the SMSC of the sending network to directly send an MT message to the third-party network, subsequently.

If the protocol type of the receiving network is different from that of the sending network, a signaling conversion is needed in the step 123 and the step 128 in the technical solution above. If the protocol type of the receiving network is different from that of the third-party network, the step 126 and the step 127 in the technical solution above need a signaling conversion. If the protocol type of the sending network is different from that of the third-party network, the step 129 and the step 1210 in the solution above need a signaling conversion.

Figure 6:
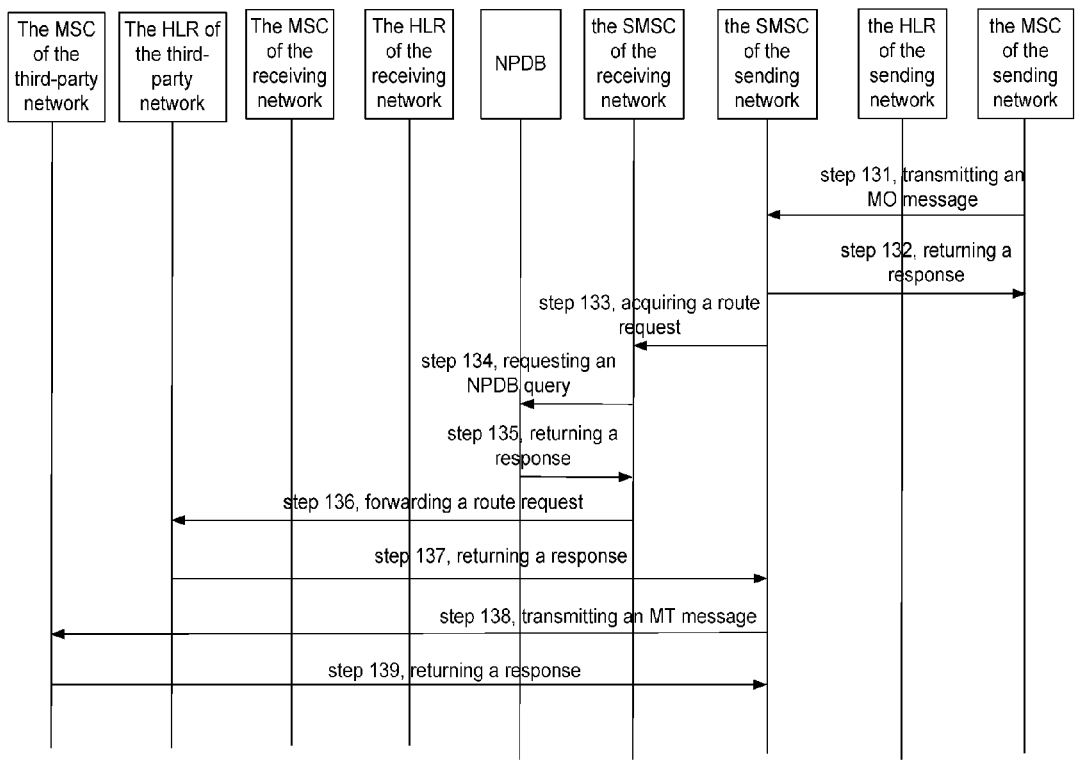
FIG. 6 shows a message flowchart of another application scene of the method for short message signaling intercommunication shown in FIG. 3.

FIG. 6 shows a message flowchart of another application scene of the method for short message signaling intercommunication in the present disclosure, the receiving network is a home network determined according to a segment number to which a mobile directory number of a receiving terminal belongs, and the receiving terminal is a third-party network subscriber; and the method comprises:

step 131, an MSC of a message sending network submits an MO message to an SMSC of the message sending network;

step 132, the MSC of the message sending network returns a response to the MSC of the message sending network;

step 133, the SMSC of the message sending network sends a route request to an SMSC of a message receiving network;

step 134, the SMSC of the message receiving network inquires of an NPDB about the current home network of a receiving terminal;

step 135, the SMSC of the message receiving network receives a response returned by the NPDB;

step 136, the SMSC of the message receiving network determines the current home network of the receiving terminal synthetically according to the returned result and a home network of a segment number to which the mobile directory number of the receiving terminal belongs, and forwards a route inquiring request a to an HLR of the third-party network after determining that the current home network of the receiving terminal is a third-party network;

step 137, the HLR of the third-party network directly returns a response message to the SMSC of the sending network;

step 138, the SMSC of the sending network sends an MT message to an MSC of the third-party network; and step 139, the MSC of the third-party network returns a response message to the sending network.

In the technical solution above, the receiving terminal is a third-party network subscriber; when the SMSC of the receiving terminal requests a route from the HLR of the third-party network, the SMSC of the receiving terminal forwards a route request of the sending network to the HLR of the third-party network by adopting a forwarding mode, then the HLR of the third-party network directly returns a response message to the SMSC of the sending network, and subsequently, the SMSC of the sending network directly sends the MT message to the receiving network.

If the protocol type of the receiving network is different from that of the sending network, the step 123 in the solution above needs a signaling conversion. If the protocol type of the receiving network is different from that of the third-party network, the step 126 and the step 127 in the solution above need a signaling conversion. If the protocol type of the sending network is different from that of the third-party network, the step 128 and the step 129 in the solution above need a signaling conversion.

Figure 7:
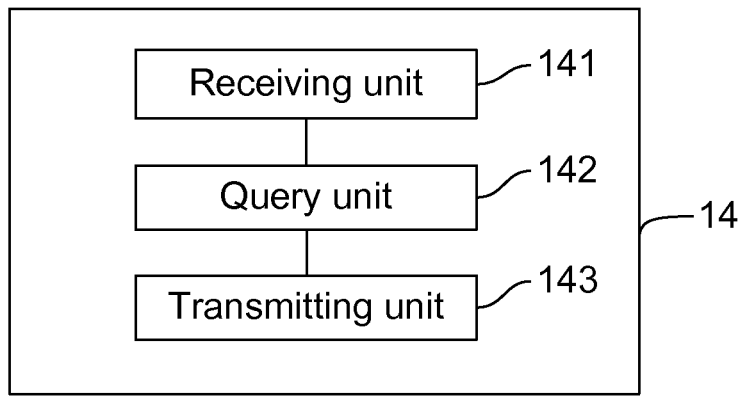
FIG. 7 shows a structure diagram of an SMSC of the sending network.

FIG. 7 shows an SMSC 14 of a sending network in the present disclosure, comprising:

a receiving unit 141, configured for receiving an MO message from an MSC of the sending network, wherein the MO message includes a mobile directory number of a receiving terminal;

a query unit 142, configured for inquiring of an NPDB about the current home network of the receiving terminal according to the mobile directory number of the receiving terminal, and acquiring information of the current home network of the receiving terminal;

a transmitting unit 143, configured for transmitting an MT message generated based on the MO message to an MSC of the current home network of the receiving terminal, according to the information of the current home network of the receiving terminal.

In the technical solution above, the SMSC of the sending network transmits an MT message generated based on the MO message to the MSC of the current home network of the receiving terminal according to the information of the current home network of the receiving terminal, thus the technical solution can be applied to the short message signaling intercommunication based on the mobile number portability service.

Optionally, the transmitting unit 143 is further configured for the SMSC of the sending network to transmit a route request message to an HLR of the current home network of the receiving terminal, wherein the route request message includes the mobile directory number of the receiving terminal; and the receiving unit 141 is further configured for receiving a route response message from the HLR of the current home network of the receiving terminal, wherein the route response message includes an MSC address of the current home network corresponding to the receiving terminal;

the transmitting unit 143 transmitting an MT message generated based on the MO message to the MSC of the current home network of the receiving terminal according to the information of the current home network of the receiving terminal, specifically comprises:

the transmitting unit 143 transmits an MT message generated based on the MO message to the MSC of the current home network corresponding to the receiving terminal; and optionally, the route response message further includes IMSI information of the receiving terminal in the current home network.

Figure 8:
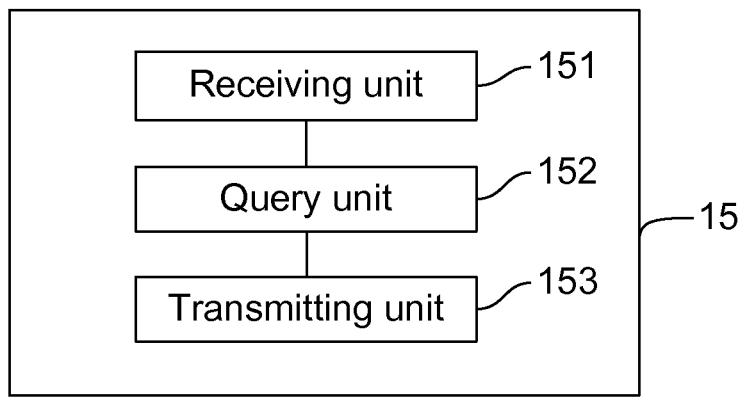
FIG. 8 shows a structure diagram of an SMSC of the receiving network.

FIG. 8 shows an SMSC 15 of a receiving network in the present disclosure, comprising:

a receiving unit 151, configured for receiving a first route request message from an SMSC of a sending network, wherein the first route request message includes a mobile directory number of a receiving terminal;

a query unit 152, configured for inquiring of an NPDB about the current home network of the receiving terminal according to the mobile directory number of the receiving terminal, and acquiring information of the current home network of the receiving terminal; and a transmitting unit 153, configured for transmitting a second route request message to an HLR of the current home network of the receiving terminal according to the information of the current home network of the receiving terminal, so that the SMSC of the sending network transmits an MT message generated according to an MO message to the MSC of the current home network of the receiving terminal;

wherein, the receiving network is a home network determined according to a segment number to which the mobile directory number of the receiving terminal belongs.

In the technical solution above, the SMSC of the receiving network transmits a second route request message to the HLR of the receiving terminal according to the information of the current home network of the receiving terminal, so that the SMSC of the sending network transmits an MT message generated according to the MO message to the MSC of the current home network of the receiving terminal, so this technical solution can be applied to short message signaling intercommunication which is based on the mobile number portability service.

Optionally, when the current home network of the receiving terminal is the receiving network, the transmitting unit 153 comprises:

a first transmitting subunit, which transmits a second route request message to the HLR of the receiving network, wherein the second route request message includes the mobile directory number of the receiving terminal;

a first receiving subunit, which receives a first route response message from the HLR of the receiving network, wherein the first route response message includes an MSC address of the receiving network corresponding to the receiving terminal;

a second transmitting subunit, which transmits a second route response message to the SMSC of the sending network, wherein the second route response message includes an address of the SMSC of the receiving network in the sending network, so that the SMSC of the sending network transmits the MT message to the SMSC of the receiving network according to the address;

a second receiving subunit, which receives the MT message from the SMSC of the sending network; and a third transmitting subunit, which forwards the MT message to the MSC of the receiving network.

Optionally, the first route response message further includes IMSI information of the receiving terminal in the current home network; the second route response message further includes IMSI information of the receiving terminal in the current home network; and the MT message includes IMSI information of the receiving terminal in the current home network.

the transmitting unit 153 further comprises:

a storing subunit, configured for storing corresponding relationships among the mobile directory number of the receiving terminal, the MSC address of the receiving network corresponding to the receiving terminal and the IMSI information of the receiving terminal in the current home network;

a first acquiring subunit, configured for acquiring IMSI information of the receiving terminal in the current home network from the MT message;

a second acquiring subunit, configured for acquiring an MSC address of the receiving network corresponding to the IMSI information of the receiving terminal in the current home network, according to the corresponding relationships; and the third transmitting subunit is configured specifically for forwarding the MT message to the MSC of the receiving network according to the MSC address of the receiving network.

Optionally, the first route response message further includes the IMSI information of the receiving terminal in the current home network; the second route response message further includes the IMSI information of the receiving terminal in the current home network; and the MT message includes the mobile directory number of the receiving terminal.

the transmitting unit 153 further comprises:

a storing subunit, configured for storing corresponding relationships among the mobile directory number of the receiving terminal, the MSC address of the receiving network corresponding to the receiving terminal and the IMSI information of the receiving terminal in the current home network;

a third acquiring subunit, configured for acquiring the mobile directory number of the receiving terminal from the MT message;

a fourth acquiring subunit, used for acquiring an MSC address of a receiving network corresponding to the receiving terminal according to the corresponding relationships; and the third transmitting subunit is configured specifically for forwarding the MT message to the MSC of the receiving network according to the MSC address of the receiving network.

Optionally, when the current home network of the receiving terminal is a third-party network, the transmitting unit 153 comprises:

a first transmitting subunit, configured for transmitting a second route request message to the HLR of the third-party network, wherein the second route request message includes the mobile directory number of the receiving terminal;

a first receiving subunit, configured for receiving a third route response message from the HLR of the third-party network, wherein the third route response message includes the MSC address of the third-party network corresponding to the receiving terminal; optionally, the third route response message may further include the IMSI information of the receiving terminal in the current home network; and a second transmitting subunit, configured for transmitting the SMSC of the sending network a fourth route response message which includes the MSC address of the third-party network, so that the SMSC of the sending network transmits an MT message generated based on the MO message to the MSC of the third-party network according to the MSC address of the third-party network; and optionally, the fourth route response message further includes the IMSI information of the receiving terminal in the current home network.

Optionally, when the current home network of the receiving terminal is a third-party network, the transmitting unit 153 comprises:

a first transmitting subunit, configured for transmitting a second route request message to the HLR of the third-party network, wherein the second route request message includes the mobile directory number of the receiving terminal, so that the HLR of the third-party network transmits a fifth route response message to the SMSC of the sending network, wherein the fifth route response message includes the MSC address of the third-party network corresponding to the receiving terminal, thus the SMSC of the sending network transmits an MT message generated based on the MO message to the MSC of the third-party network according to the MSC address of the third-party network. Optionally, the fifth route response message further includes the IMSI information of the receiving terminal in the current home network.

In the technical solution above, the SMSC can be further configured for receiving and transmitting a signaling message, converting messages of different protocol types, and controlling logic processes of message intercommunication. As a signaling sending network, the SMSC receives signaling of the sending network, converts the signaling into a signaling message of the receiving network and delivers the signaling message to the receiving network; as a signaling receiving network, the SMSC receives a signaling message of a sending network, converts the signaling message into a signaling message of the receiving network as required and delivers it to a third-party network finally. The short messages include short messages, multimedia messages and so on. The sending network is an initiating party who sends a short message, and the receiving network is a receiving party who receives the short message. The third-party network may be the same as or different from the sending network. The sending network may be the same as or different from the receiving network.

In prior art, when a GSM SMSC sends a route request to a CDMA SMSC, the CDMA SMSC does not request a route from a real HLR, but directly returns a simulated HLR message to the GSM SMSC, such HLR response message does not include real IMSI information of a subscriber, therefore, the simulated HLR response message cannot meet the requirement of the operator, because initiating operator judges network information of the called operator based on real IMSI information, so as to make a correct inter-network settlement and so on In the present disclosure, real IMSI information of a subscriber in the current home network can be returned, thus the requirement of the operator can be met.

The present disclosure solves the problems in the prior art that the procedure of signaling intercommunication cannot be applied to the Mobile Number Portability service and the forwarding operation does not involve third-party signaling, thereby realizing signaling intercommunication based on the Mobile Number Portability service, and guaranteeing better Mobile Number Portability service.

The embodiments of the method correspond to the embodiments of the device. The part not described in detail in the embodiments of the method can refer to the related part in the embodiments of the device, and the part not described in detail in the embodiments of the device can refer to the related part in the embodiments of the method.

Those skilled in the art should understand that all or part of the steps in the method in the embodiments above can be implemented by related hardware instructed by program; the program may be stored in a computer-readable storage medium, such as diskette, optical disk, Read-Only Memory (ROM) or Random Access Memory (RAM); when the program is executed, the program includes the steps in the method embodiments above.

In these method embodiments of the present disclosure, the sequence numbers of steps cannot be used for limiting the sequence of these steps; and for the those skilled in the art, the changing of the sequence of these steps shall fall within the protection scope of the present disclosure if no creative effort is made.

The described above are preferred embodiments; and it should be noted that those skilled in the art can make various modifications and equivalent replacements without departing from the principle of the present disclosure; and these modifications and equivalent replacements should be deemed to be included in the protection scope of the present disclosure.

The invention claimed is:

1. A method for short message signaling intercommunication, comprising:
   step 21, receiving a first route request message from a Short Message Service Center (SMSC) of a sending network by an SMSC of a receiving network, wherein the first route request message includes a mobile directory number of a receiving terminal;
   step 22, inquiring of a Number Portability Data Base (NPDB) about a current home network of the receiving terminal by the SMSC of the receiving network, according to the mobile directory number of the receiving terminal; and
   step 23, transmitting a second route request message to a Home Location Register (HLR) of the current home network of the receiving terminal by the SMSC of the receiving network; and transmitting a Mobile Terminal (MT) message to a Mobile Switching Center (MSC) of the current home network by the SMSC of the sending network; wherein if the current home network of the receiving terminal is the receiving network, the step 23 specifically is:
      the SMSC of the receiving network transmits a second route request message to an HLR of the receiving network, wherein the second route request message includes the mobile directory number of the receiving terminal;
      the SMSC of the receiving network receives a first route response message from the HLR of the receiving network, wherein the first route response message includes an MSC address of the current home network corresponding to the receiving terminal;
      the SMSC of the receiving network transmits a second route response message to the SMSC of the sending network, wherein the second route response message includes an address of the SMSC of the receiving network in the sending network; and the SMSC of the sending network transmits the MT message to the SMSC of the receiving network according to the address;
      the SMSC of the receiving network receives the MT message from the SMSC of the sending network; and
      the SMSC of the receiving network transmits the MT message to an MSC of the receiving network.

2. The method for short message signaling intercommunication according to claim 1, further comprising: after the step 21, if a protocol type of the receiving network is different from that of the sending network, then performing a signaling conversion on the received first route request message by the SMSC of the receiving network according to the protocol type of the receiving network; and if a protocol type of the receiving network is different from that of the current home network of the receiving terminal, the second route request message is a message constructed according to a protocol of the current home network of the receiving terminal.

3. The method for short message signaling intercommunication according to claim 1, wherein the first route response message further includes IMSI information of the receiving terminal in the current home network;

the second route response message further includes IMSI information of the receiving terminal in the current home network; and the MT message includes IMSI information of the receiving terminal in the current home network;

after the step of receiving a first route response message from the HLR of the receiving network by the SMSC of the receiving network, the method further comprises:

storing, by the SMSC of the receiving network, corresponding relationships among the mobile directory number of the receiving terminal, the MSC address of the receiving network corresponding to the receiving terminal and the IMSI information of the receiving terminal in the current home network; and before the step of transmitting the MT message to the MSC of the receiving network by the SMSC of the receiving network, the method further comprises:

acquiring, by the SMSC of the receiving network, the IMSI information of the receiving terminal in the current home network from the MT message; and acquiring, by the SMSC of the receiving network, the MSC address of the receiving network corresponding to the IMSI information of the receiving terminal in the current home network, according to the corresponding relationships; and the transmitting the MT message to the MSC of the receiving network by the SMSC of the receiving network specifically is:

transmitting the MT message to the MSC of the receiving network by the SMSC of the receiving network according to the MSC address of the receiving network.

4. The method for short message signaling intercommunication according to claim 1, wherein the first route response message further includes the IMSI information of the receiving terminal in the current home network;

the second route response message further includes the IMSI information of the receiving terminal in the current home network; and the MT message includes the mobile directory number of the receiving terminal;

after the step of receiving the first route response message from the HLR of the receiving network by the SMSC of the receiving network, the method further comprises:

storing, by the SMSC of the receiving network, corresponding relationships among the mobile directory number of the receiving terminal, the MSC address of the receiving network corresponding to the receiving terminal and the IMSI information of the receiving terminal in the current home network; and before the step of transmitting the MT message to the MSC of the receiving network by the SMSC of the receiving network, the method further comprises:

acquiring the mobile directory number of the receiving terminal from the MT message by the SMSC of the receiving network; and acquiring the MSC address of the receiving network corresponding to the receiving terminal by the SMSC of the receiving network according to the corresponding relationships;

the transmitting the MT message to the MSC of the receiving network by the SMSC of the receiving network is specifically:

transmitting the MT message to the MSC of the receiving network by the SMSC of the receiving network, according to the MSC address of the receiving network.

5. A method for short message signaling intercommunication, comprising:

step 21, receiving a first route request message from a Short Message Service Center (SMSC) of a sending network by an SMSC of a receiving network, wherein the first route request message includes a mobile directory number of a receiving terminal;

step 22, inquiring of a Number Portability Data Base (NPDB) about a current home network of the receiving terminal by the SMSC of the receiving network, according to the mobile directory number of the receiving terminal; and step 23, transmitting a second route request message to a Home Location Register (HLR) of the current home network of the receiving terminal by the SMSC of the receiving network; and transmitting a Mobile Terminal (MT) message to a Mobile Switching Center (MSC) of the current home network by the SMSC of the sending network; wherein if the current home network of the receiving terminal is a third-party network, the step 23 specifically is:

the SMSC of the receiving network forwards the second route request message to the HLR of the third-party network, wherein the second route request message includes the mobile directory number of the receiving terminal;

the SMSC of the receiving network receives a third route response message from the HLR of the third-party network, wherein the third route response message includes an MSC address of the third-party network corresponding to the receiving terminal; and the SMSC of the receiving network transmits a fourth route response message to the SMSC of the sending network, wherein the fourth route response message includes the MSC address of the third-party network; and the SMSC of the sending network transmits the MT message to the MSC of the third-party network according to the MSC address of the third-party network.

6. The method for short message signaling intercommunication according to claim 5, wherein the third route response message further includes IMSI information of the receiving terminal in the current home network; and the fourth route response message further includes IMSI information of the receiving terminal in the current home network.

7. A method for short message signaling intercommunication, comprising:

step 21, receiving a first route request message from a Short Message Service Center (SMSC) of a sending network by an SMSC of a receiving network, wherein the first route request message includes a mobile directory number of a receiving terminal;

step 22, inquiring of a Number Portability Data Base (NPDB) about a current home network of the receiving terminal by the SMSC of the receiving network, according to the mobile directory number of the receiving terminal; and step 23, transmitting a second route request message to a Home Location Register (HLR) of the current home network of the receiving terminal by the SMSC of the receiving network; and transmitting a Mobile Terminal (MT) message to a Mobile Switching Center (MSC) of the current home network by the SMSC of the sending network; wherein if the current home network of the receiving terminal is a third-party network, the step 23 specifically is:

the SMSC of the receiving network forwards the second route request message to the HLR of the third-party network, wherein the second route request message includes the mobile directory number of the receiving terminal; the HLR of the third-party network transmits a fifth route response message to the SMSC of the sending network, wherein the fifth route response message includes an MSC address of the third-party network corresponding to the receiving terminal; and the SMSC of the sending network transmits the MT message to the MSC of the third-party network according to the MSC address of the third-party network.

8. The method for short message signaling intercommunication according to claim 7, wherein the fifth route response message further includes IMSI information of the receiving terminal in the current home network.

9. A short message service center (SMSC), located in a receiving network, comprising:

a memory storing programming instructions; and a processor configured to be capable of executing the stored programming instructions to perform steps comprising:

receiving a first route request message from an SMSC of a sending network, wherein the first route request message includes a mobile directory number of a receiving terminal;

inquiring of an NPDB about a current home network of the receiving terminal according to the mobile directory number of the receiving terminal; and transmitting a second route request message to an HLR of the current home network of the receiving terminal, wherein the second route request message includes the mobile directory number of the receiving terminal;

receiving a first route response message from the HLR of the current home network, wherein the first route response message includes an MSC address of the current home network corresponding to the receiving terminal;

transmitting a second route response message to the SMSC of the sending network, wherein the second route response message includes an address of the SMSC of the current home network in the sending network;

transmitting an MT message to the SMSC of the current home network according to the address;

receiving the MT message from the SMSC of the sending network; and transmitting the MT message to an MSC of the current home network.

10. The method for short message signaling intercommunication according to claim 5, further comprising: after the step 21, if a protocol type of the receiving network is different from that of the sending network, then performing a signaling conversion on the received first route request message by the SMSC of the receiving network according to the protocol type of the receiving network; and if a protocol type of the receiving network is different from that of the current home network of the receiving terminal, the second route request message is a message constructed according to a protocol of the current home network of the receiving terminal.

11. The method for short message signaling intercommunication according to claim 7, further comprising: after the step 21, if a protocol type of the receiving network is different from that of the sending network, then performing a signaling conversion on the received first route request message by the SMSC of the receiving network according to the protocol type of the receiving network; and if a protocol type of the receiving network is different from that of the current home network of the receiving terminal, the second route request message is a message constructed according to a protocol of the current home network of the receiving terminal.

* * * * *